(12) United States Patent
Springett et al.

(10) Patent No.: US 8,553,086 B2
(45) Date of Patent: Oct. 8, 2013

(54) SPATIO-ACTIVITY BASED MODE MATCHING

(75) Inventors: Jarrad Michael Springett, Cambridge (GB); Peter Jan Pakulski, Marsfield (AU); Jeroen Vendrig, Liberty Grove (AU)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 12/919,958

(22) PCT Filed: Feb. 25, 2009

(86) PCT No.: PCT/AU2009/000211
§ 371 (c)(1),
(2), (4) Date: Oct. 26, 2010

(87) PCT Pub. No.: WO2009/105812
PCT Pub. Date: Sep. 3, 2009

(65) Prior Publication Data
US 2011/0043699 A1      Feb. 24, 2011

(30) Foreign Application Priority Data
Feb. 28, 2008  (AU) ................................. 2008200967

(51) Int. Cl.
H04N 7/18 (2006.01)
H04N 5/14 (2006.01)
(52) U.S. Cl.
USPC ........ 348/143; 348/222.1; 348/142; 348/571; 382/219
(58) Field of Classification Search
USPC ........... 340/903; 382/104, 107, 219; 348/142, 348/135
See application file for complete search history.

(56) References Cited

U.S. PATENT DOCUMENTS

| | | | | |
|---|---|---|---|---|
| 6,078,619 | A | 6/2000 | Monro et al. | 375/240 |
| 6,356,206 | B1* | 3/2002 | Takenaga et al. | 340/903 |
| 6,954,544 | B2* | 10/2005 | Jepson et al. | 382/107 |
| 7,248,718 | B2* | 7/2007 | Comaniciu et al. | 382/104 |
| 7,639,841 | B2* | 12/2009 | Zhu et al. | 382/104 |
| 2008/0152017 | A1 | 6/2008 | Vendrig et al. | 375/240.27 |
| 2008/0152236 | A1* | 6/2008 | Vendrig et al. | 382/224 |

FOREIGN PATENT DOCUMENTS

| WO | WO 01/45422 A1 | 6/2001 |
|---|---|---|
| WO | WO 2005/081189 A1 | 9/2005 |

* cited by examiner

Primary Examiner — Jefferey Harold
Assistant Examiner — Jean W Desir
(74) Attorney, Agent, or Firm — Fitzpatrick, Cella, Harper & Scinto

(57) ABSTRACT

Disclosed is a method (101), in relation to a current video frame (300) comprising a visual element (320) associated with a location in a scene captured in the frame (300), said visual element (320) being associated with a plurality of mode models (350), said method matching (140) one of said plurality of mode models (350) to the visual element (320), said method comprising, for each said mode model (350), the steps of determining (420) a visual support value depending upon visual similarity between the visual element (320) and the mode model (350), determining (440) a spatial support value depending upon similarity of temporal characteristics of the mode models (350) associated with the visual element and mode models (385) of one or more other visual elements (331); and identifying (450) a matching one of said plurality of mode models (350) depending upon the visual support value and the spatial support value.

17 Claims, 8 Drawing Sheets

SPATIO-ACTIVITY BASED MODE MATCHING

FIELD OF THE INVENTION

The current invention relates generally to video processing and, in particular, to the separation of foreground objects from a background in video.

BACKGROUND

Video cameras, such as Pan-Tilt-Zoom (PTZ) cameras, are omnipresent nowadays, mostly for surveillance purposes. The cameras capture more data (video content) than human viewers can process. Automatic analysis of video content is therefore needed.

An important step in the processing of video content is the segmentation of video data into foreground objects and a background scene, or background. Such segmentation allows for further analysis, such as detection of specific foreground objects, or tracking of moving objects. Such further analysis may, for example, result in sending an alert to a security guard.

Automatic analysis is also relevant to PTZ cameras. PTZ cameras may change their field of view without human intervention based on preset orientations, or even based on the observed video content. For example, when tracking a walking person, the camera may automatically pan to keep the person within the field of view.

A common approach to foreground/background segmentation is background subtraction. For example, the median pixel value for a position in a scene may be compared against the current pixel value at that position. If the current pixel value is similar to the median pixel value, the pixel is considered to be belonging to the background, otherwise the pixel is considered to be belonging to a foreground object. The challenge for such approaches is to define similarity and to be robust against stationary foreground objects that may be confused with background.

Although more complex background modelling methods are known in the art, these methods are computationally expensive, and their memory requirements typically do not allow the methods to be embedded on devices such as cameras.

SUMMARY

It is an object of the present invention to substantially overcome, or at least ameliorate, one or more disadvantages of existing arrangements.

Disclosed are arrangements, referred to as Spatio-activity based mode matching (SABMM) arrangements, which seek to address the above problems by maintaining, for each block in a frame (part of a video stream), several mode models that represent the content at that point (also referred to as a location or a locale) in the scene in question over a history of many frames. For each mode model, a record is kept of how often the model is active, i.e. how often the model is applicable to an input frame. Similarity in activity for spatially neighbouring blocks (eg the 4-connected neighbouring blocks of the block in question) is taken into account to determine the active mode for a block in a new input frame. A temporal characteristic is thus used for determining supporting evidence amongst spatially neighbouring blocks instead of visual characteristics.

According to a first aspect of the present invention, there is provided a method 101, in relation to a current video frame 300 comprising a visual element 320 associated with a location in a scene captured in the frame 300, of matching 140 one of a plurality of mode models 350 to said visual element 320, said method comprising the steps of:

associating said visual element 320 being associated with a said plurality of mode models 350 each based on a time history of values for said visual element over a number of frames; and said method matching 140 one of said plurality of mode models 350 to the visual element 320, said matching step comprising, for each said mode model 350, the steps of:

determining 420 a visual support value depending upon similarity of corresponding visual characteristics of the visual element 320 and the mode model 350;

determining 440 a spatial support value depending upon similarity of corresponding temporal characteristics of the mode models 350 associated with the visual element and mode models 385 of one or more other visual elements in the vicinity of said visual element 331; and identifying 450 a matching one of said plurality of mode models 350 depending upon the visual support value and the spatial support value.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
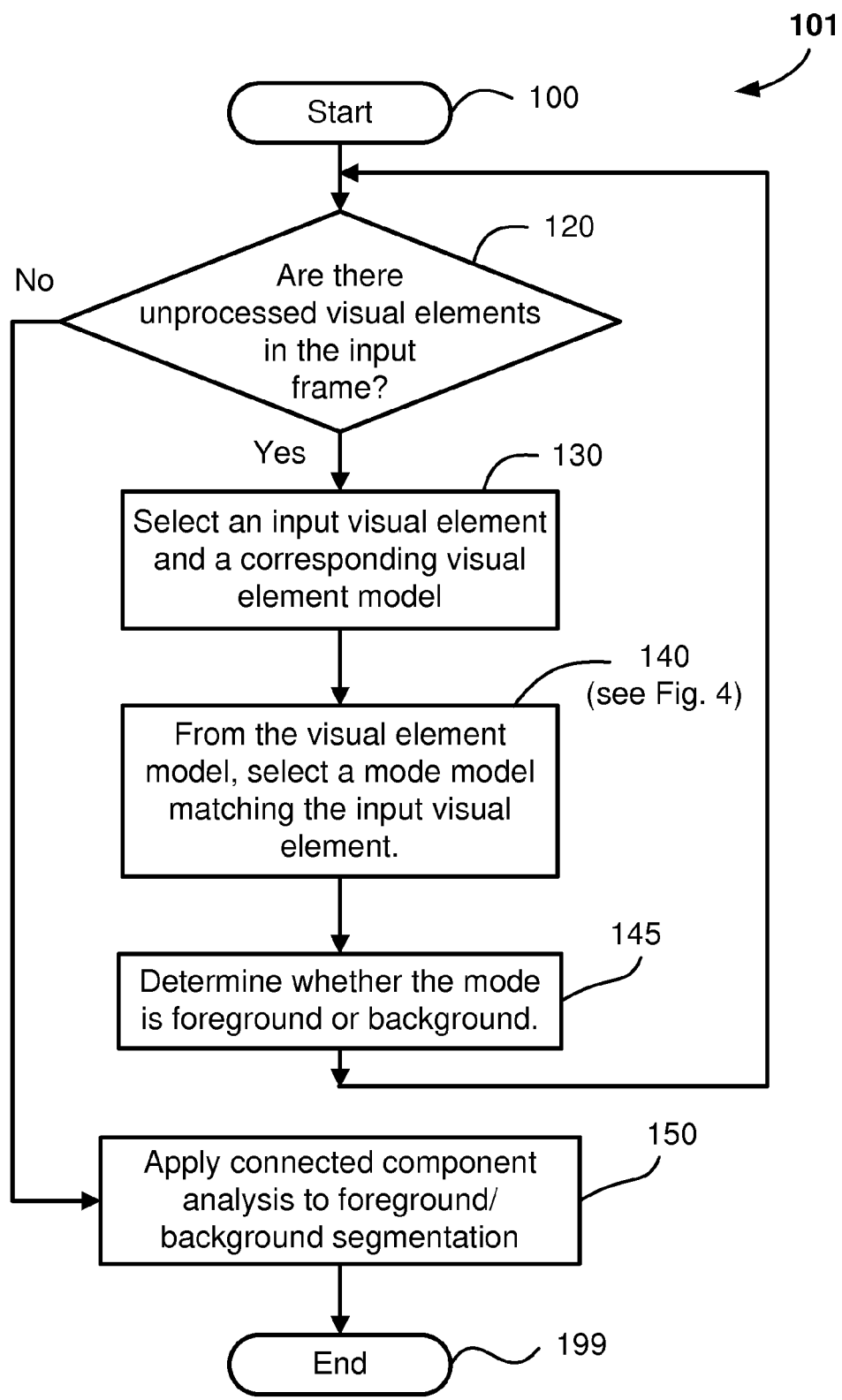
FIG. 1 is a flow chart of a foreground/background separation data process.

Where reference is made in any one or more of the accompanying drawings to steps and/or features, which have the same reference numerals, those steps and/or features have for the purposes of this description the same function(s) or operation(s), unless the contrary intention appears.

It is to be noted that discussions relating to prior art arrangements relate to devices which may form public knowledge through their use. Such discussions should not be interpreted as a representation by the present inventors or patent applicant that such devices in any way form part of the common general knowledge in the art.

Introduction

A camera may be used to capture video frames representing the visual content of a scene appearing in the field of view of the camera. In the case of a pan-tilt camera, the orientation of the camera may be altered to change the field of view. The camera may therefore capture video frames of a scene, with the scene being larger than the field of view of the camera.

Figure 8:
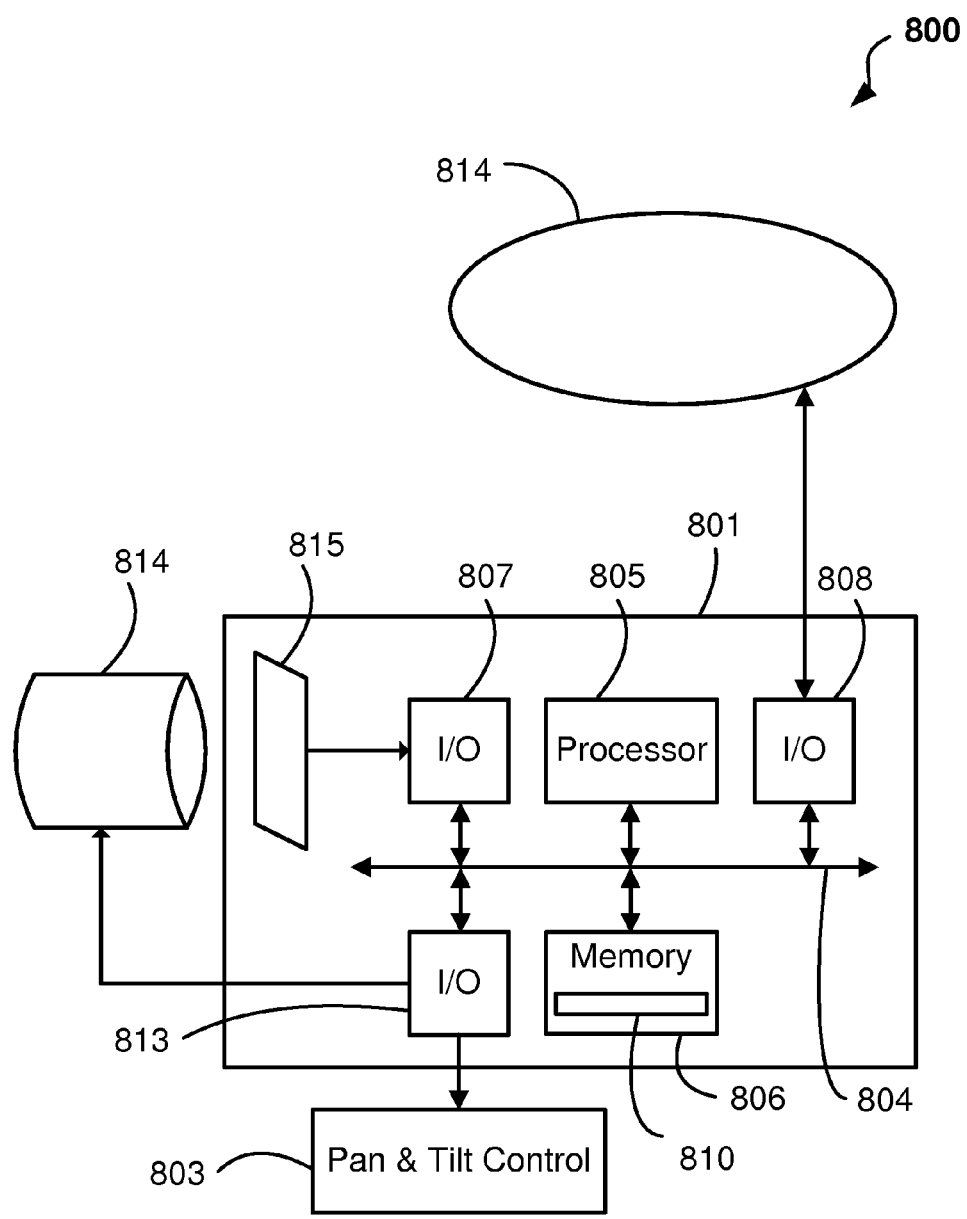
FIG. 8 shows a schematic block diagram of a camera upon which the methods of FIGS. 1 and 4-7 may be practiced.

FIG. 8 shows a functional block diagram of a camera 800 upon which the SABMM arrangements may be practiced. The camera 800 is a pan-tilt-zoom camera (PTZ) comprising a camera module 801, a pan and tilt module 803, and a lens system 814. The camera module 801 typically includes at least one processor unit 805, and a memory unit 806, a photosensitive sensor array 815, an input/output (I/O) interface 807 that couples to the sensor array 815, an input/output (I/O) interface 808 that couples to a communications network 814, and an interface 813 for the pan and tilt module 803 and the lens system 814. The components 807, 805, 808, 813 and 806 of the camera module 801 typically communicate via an interconnected bus 804 and in a manner which results in a conventional mode of operation known to those in the relevant art.

Each frame captured by the camera 800 comprises more than one visual element. A visual element may be defined as an image sample. In one SABMM arrangement the visual element is a pixel, such as a Red-Green-Blue (RGB) pixel. In another embodiment each visual element comprises a group of pixels. In yet another embodiment the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard. The colour model is typically YUV, where the Y component represents the luminance, and the U and V represent the chrominance.

Separation of the visual elements appearing in video frames into foreground objects and background may be achieved by comparing the captured input visual elements at a point in time to corresponding visual elements at the same locale in the scene, but captured at different points in time.

Foreground/background separation can be performed on frames, or regions in frames. Such regions may have been identified using knowledge about the domain (ie knowledge about the environment in which the SABMM system is operating). For example, to save processing power and energy consumption, a user may specify that no foreground/background separation is to be performed on a particular part of the scene. The reason for such an exclusion may be that a part of the scene (where foreground/background separation is to be performed) is a restricted area and thus requires foreground/background and other processing, while the other part (where foreground/background separation is not to be performed) is public space and thus of no interest.

A background model is used to represent the visual elements within the scene captured at different points in time. The background model is a representation of the non-transient parts visible in the scene. Accordingly, the background model describes a scene containing no foreground objects. In a simple case, a first frame may be used as the background model. If the frame contains no foreground objects, that first frame is an accurate background model as that first frame is a representation of the non-transient parts visible in the scene. However, using the first frame as the background model is not robust against gradual changes within the scene, or against illumination effects. Also, the assumption that the first frame contains no foreground objects is generally not realistic. In the case of pan-tilt cameras, the first frame also does not cover the entire scene.

A better approach to modelling the background is to use a statistical function of the data that represents the scene. In one SABMM embodiment, fixed values that are derived from a statistical function of the frame data, such as the mean or median of the data, are used to construct the background model. Accordingly, a visual element in the background model may have a fixed value of R=100, G=150, B=200, or luminance=123.45, or transform coefficients {-50, 28, 76, 38}.

The individual values for the channels or coefficients in the background model may be computed individually. That is, the total representation of the visual element in the background model does not necessarily relate to any one specific visual element in the history used as input to the statistical function.

In another SABMM embodiment, a distribution is computed for each visual element in the background model. For example, the mean of the colour channels or of the transform coefficients may be used, together with a standard deviation of the same. This allows for a more dynamic interpretation of a visual element, because an observed value different to, but sufficiently similar to the mean may be considered to belong to the background model. In yet another SABMM embodiment, the background can be multi-modal. Consider the case of an elevator light which may be on or off. In such a case a mean/standard deviation pair is used to represent the "on" state of the light, and another pair is used to represent the "off" state of the light.

In yet another SABMM embodiment, a filter may be applied to the incoming data to actively maintain different distributions in different modes. For example, prior knowledge of a bright flashing light in a scene can be used to deliberately maintain separate states for when the light is on and for when the light is off, thus constructing models with better statistical coherence than would be modelled otherwise. Alternatively, this filtering process can result in some data which is excluded from being modelled entirely. For example, considering the same case of the flashing light, and presuming that the flashing behaviour is rare, and differs in some way which makes its impact on the scene inconsistent, e.g. location or colour. In such a case, affected frames can be detected, and it is known in advance that those frames are irrelevant and non-repetitive, so they are excluded from the modelling process entirely.

In all cases the background is modelled, but with different visual characteristics. In yet another SABMM embodiment, all visual content (including foreground) is modelled into the background model, and it is decided later, based on this background model, which visual elements are considered to represent foreground objects, and which content is considered to represent the background. The standard deviation of each distribution may for example be used to make this decision, with visual elements having a standard deviation greater than a threshold considered to represent foreground objects. The remainder of the visual elements are then considered to represent the background.

Scene Model.

Figure 2:
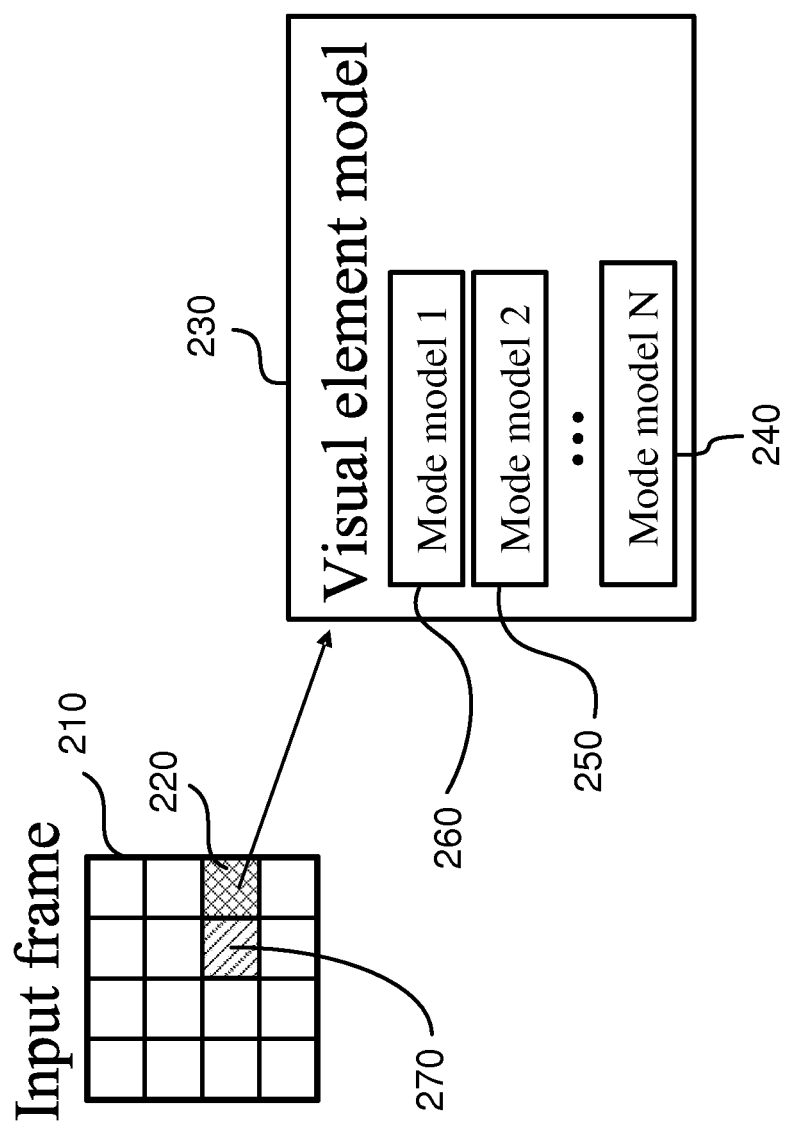
FIG. 2 depicts data stored in memory according to one SABMM arrangement.

FIG. 2 depicts data stored in memory according to one SABMM arrangement. As previously noted, a PTZ camera may cover a scene whose extent is larger than the field of view of the camera, this field of view corresponding to the input frame. For ease of understanding, unless otherwise stated, descriptions relating to an input frame relate to the case in which the scene being considered is the same as the field of view of the camera, and accordingly the input frame captures the entire scene in question. The SABMM approach is not however limited to this restricted case.

An input frame 210 consists of several visual elements such as 220. The visual element 220 is the elementary unit at which processing takes place, and may, for example, be a pixel or an 8×8 DCT block. The visual element 220 is captured by an image sensor such as 815 in the camera 800.

For each input visual element 220 that is modelled, a visual element model 230 is maintained. The visual element model 230 consists of one or more mode models such as 240. Each mode model 240 is based on a time history of values for the visual element 220. There can be several mode models 240 corresponding to the same location in the captured input frame 210. For example, if there is a flashing neon light, one mode model 240 may represent "background—light on", another mode model 250 may represent "background—light off", and yet another mode model 260 may represent "foreground" such as part of a passing car.

In one SABMM arrangement, different mode models such as 240 in a particular visual element model such as 230 may be based upon different attributes of the corresponding visual element 220. Thus in one arrangement one or more of the mode models for the visual element 220 are based upon the mean values of pixel intensity values for the visual element 220. In another arrangement, one or more of the mode models for the visual element 220 are based upon the median or the approximated median of observed DCT coefficient values for each DCT coefficient for the visual element 220, and the mode models for the visual element 220 record temporal characteristics of the visual element 220.

Figure 4:
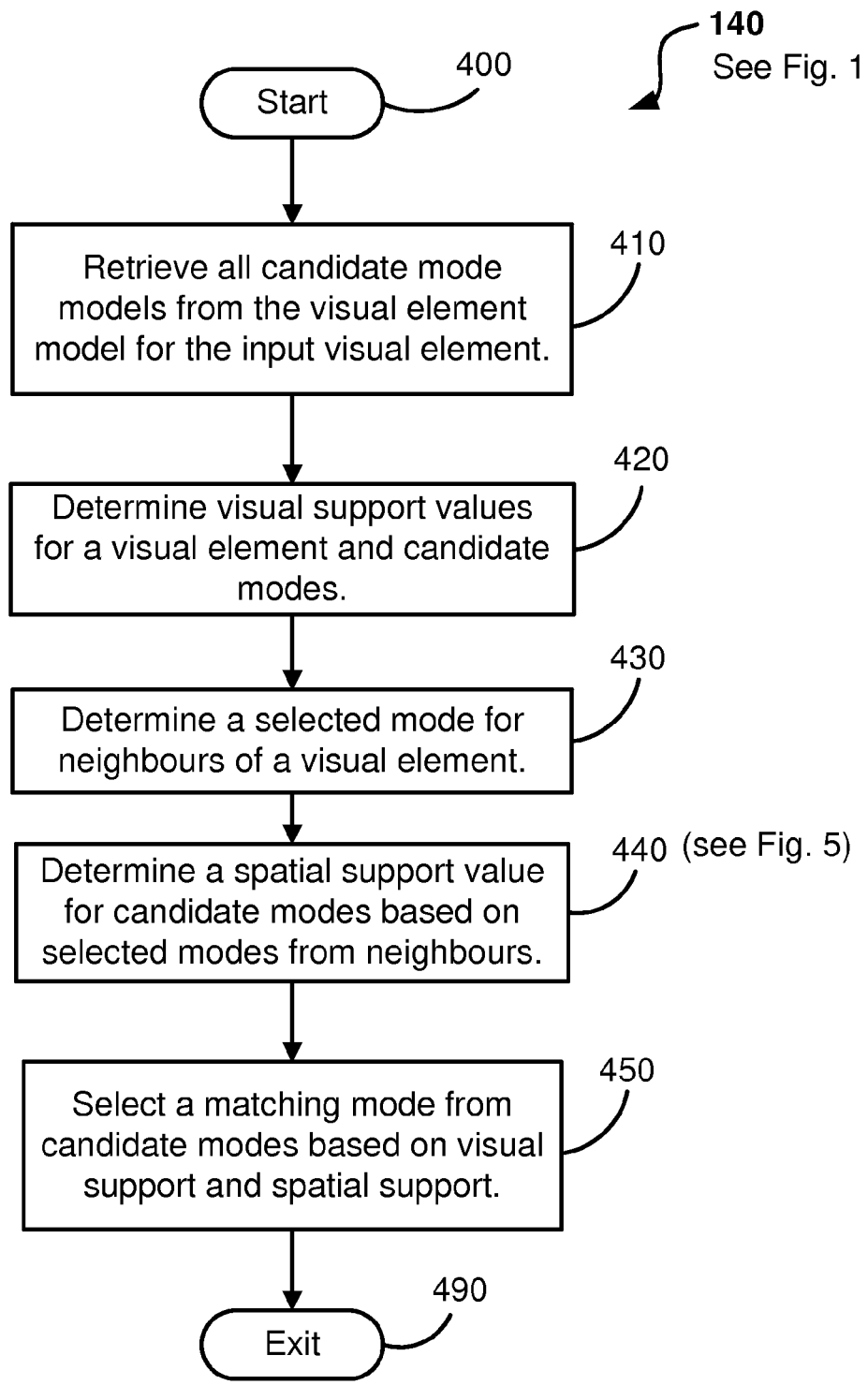
FIG. 4 is a flow diagram illustrating a method of mode matching.

Examples of temporal characteristics are (a) activity count (ie the number of times the mode model in question has been considered to be applicable or representative for the input visual element 220 (ie the number of times the mode model is found to match the visual element in question according to a step 140 in FIG. 1 or a step 450 in FIG. 4), which usually corresponds to the number of times the mode model in question was updated), (b) creation time (ie the time stamp or frame number corresponding to the creation of the mode model), or (c) reappearance time (ie the last time the mode model was found not to be representative for the input visual element 220). In an arrangement referred to as the "Mixture of Gaussians" approach, the mode model consists of a mean and standard deviation for each of the three colour channels (R, G, and B) in a pixel in the visual element 220 and a weighted sum of all the times the mode model matched the input pixel. In general the term "temporal characteristic" as applied to mode models relate to aggregate types of information such as activity type.

General Approach to Foreground Segmentation.

FIG. 1 is a flow chart of a foreground/background separation (segmentation) data process 101 used in some SABMM arrangements. The segmentation process 101 starts at a step 100 with an input frame such as 210 (see FIG. 2) captured by the lens 814 and the image sensor 815 in the camera 800 (see FIG. 8). In a following step 120 the processor 805 performs a check to determine whether any visual elements such as 220, such as pixels or blocks, have not yet been processed. If there are no more visual elements such as 220 to be processed, the segmentation process 101 is complete at the visual element level and is directed by a NO arrow from the step 120 to a post-processing step 150 in which the processor 805 may perform connected component analysis on the segmentation results using standard techniques such as flood fill. For example, small connected components may be removed. After that, the process 101 is directed to an END step 199 which completes the processing with respect to the input frame in question. The process 101 can be repeated for other frames in the sequence.

Returning to the step 120, if there are more visual elements such as 220 to be processed, the process 101 is directed from the step 120 by a YES arrow to a step 130 in which the processor 805 selects another visual element such as 220 for SABMM processing, and the corresponding visual element model 230 is found (ie retrieved from the memory 806 where is has been stored). In a following step 140 (see FIG. 4 for more detail) the visual element 220 from the input frame 210 is compared by the processor 805 against the mode models such as 240 in the visual element model 230 in order to select a matching mode, as is discussed in more detail below. The process performed in the step 140 is referred to as the "mode matching" process).

In a following step 145 the processor 805 then determines, for the matching mode determined in the step 140, whether the visual element in question 220 represents foreground or background. Depending on the type of background model, the model of the matching mode is usually updated (not shown) for the value of the input visual element. Next, the process 101 is directed from the step 145 to the step 120 and more visual elements are processed.

Selecting a Matching Mode (See the Step 140 in FIG. 1)

There are various ways to select a matching mode by the step 140 in the process 101 in FIG. 1. In one SABMM arrangement, all the mode models 240 in the visual element model in question such as 230 are compared to the input visual element 220, and the mode model with the highest similarity is selected as a matching mode.

In another SABMM arrangement, a threshold value is used to determine if there is an acceptable match, and once the first mode model satisfying the threshold is found, there is no need to compare further mode models. In one example a mode model match is determined if the input value of the visual element 220 is within 2.5 standard deviations of the mean of the mode model in question. This arrangement is useful when computing a similarity is an expensive operation.

In yet another SABMM arrangement, more than one match criterion may be used to obtain more than one type of match, and the match type may be used to determine a later process or mode for a process to act upon. For example, separate matches may be made for an intensity pattern match, and for an overall brightness match.

An important issue in the above-noted processes for selecting the matching mode in the step 140 relates to computing similarity. For simple background mode models, such as those based upon mean intensity, the computation of similarity is straightforward. However for more complex background models determining similarity is not trivial. For example, when the visual element ss0 is an 8×8 block with DCT coefficients, similarity needs to be defined over multiple dimensions. In one SABMM arrangement, machine learning techniques, such as Support Vector Machines and Naïve Bayes classifiers, are used to map multi-dimensional input image values from the visual element 220 to one probability value, indicating the probability that a particular mode model such as 240 matches the input visual element 220 in question.

The problem of selecting, in the step 140 in FIG. 1, a matching mode model is now reduced to interpreting the above-noted probability value. One arrangement for interpreting the probability value is to threshold probability values to determine a mode match. In an alternative arrangement, a mode match is based not only on the matching characteristics of one visual element but also on the characteristics of neighbouring visual elements and corresponding visual element models as described below.

Determining Whether a Mode is Foreground (See the Step 145 in FIG. 2).

When a mode model such as 240 is matched to the corresponding input visual element 220, it needs to be determined whether the mode model is foreground or background or any other set category. In general, foreground/background determination is done by evaluating the temporal characteristics of the mode model. If a mode model has been sufficiently persistent over time, it is assumed that it represents the background. If a mode model has been around for a short period only, it is assumed it is associated with a non-persistent foreground object. By using multiple mode models (eg 240, 250 and 260 in FIG. 2), there can be several background mode models. For example, if there is a flashing neon light, one mode model represents "light on", a second mode model "light off" and a third mode model "passing car occluding the neon light".

In one SABMM arrangement, a visual element such as 220 is considered to be a foreground object if the matching mode model was created a certain number of frames, say 1000, or seconds, say 200, ago. In another SABMM arrangement, a visual element 220 is considered to be a foreground object if the matching mode model has been selected more times than a threshold value.

Using Temporal Characteristics of Spatially Neighbouring Visual Elements

A mode match (ie the step 140 in the process 101 in FIG. 2 which seeks a match between the visual element 220 and one of the mode models such as 240 in the corresponding visual element model 230) that is based purely on the information in the visual element 220 is sensitive to noise. Noise can be reduced by taking into account the context, i.e. spatially neighbouring visual elements such as 270 (see FIG. 2).

The goal of object detection is to find objects that are made up of multiple visual elements such as 220. Therefore, when one visual element is found to be foreground, it is reasonable to expect that there are other foreground visual elements in the neighbourhood. If there are none, it is possible that the visual element should not be determined to be foreground.

Visual elements such as 220 and 270 that are part of the same object are not necessarily visually similar. However, they are likely to have similar temporal characteristics. For example, if the object is moving, all visual elements associated with the object will have been visible for a short period only. In contrast, if the object is stationary, all visual elements associated with the object will have been modelled for a similar, longer period.

The SABMM approach makes use of the similarity in temporal characteristics of mode models to match modes (ie to select the appropriate mode model for the visual element in question in the step 140 in FIG. 1). This is described with reference to FIG. 3 (which depicts the relationships between data used in the SABMM approach), FIG. 4 (which depicts an overview of the process used), and FIG. 5 (which shows, in mode detail, the step 440 in FIG. 4).

Figure 3:
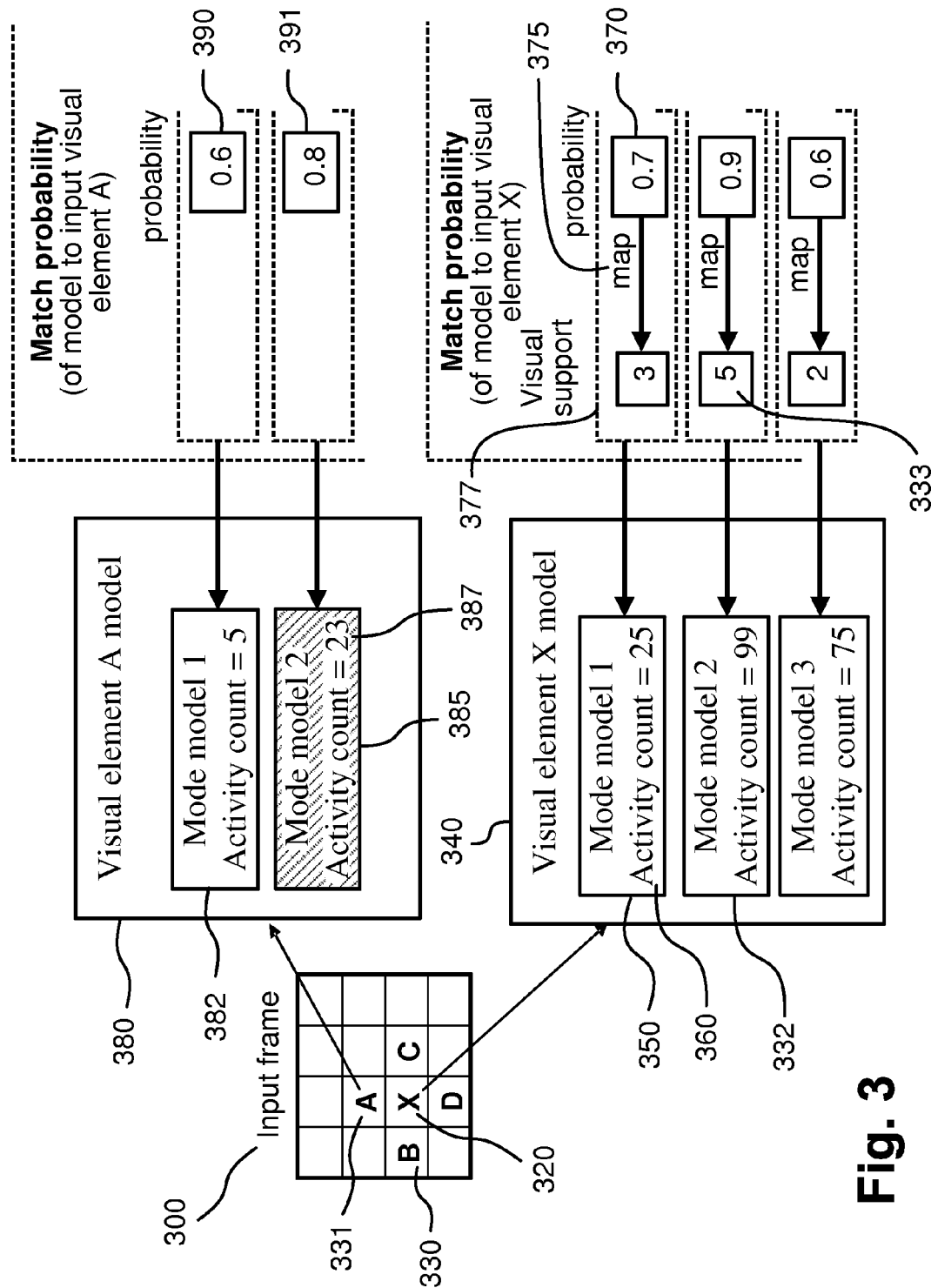
FIG. 3 depicts data used to make mode matching decisions.

FIG. 3 depicts data used to make mode matching decisions. The approach in FIG. 3 is described in relation to an input visual element 320 in a current input frame 300. FIG. 4 is a flow diagram illustrating a method 140 (see FIG. 1) of mode matching which is described in relation to FIG. 3. The process 140 in FIG. 4 should be considered in the context of the data relationships depicted in FIG. 3.

In FIG. 3, a visual element "X" (having an associated reference numeral 320) is depicted as having four neighbouring visual elements "A", "B", "C" and "D". For each visual element 320, and having regard to FIG. 4, the process 140 starts with a start step 400 after which the processor 805 retrieves, in a step 410, all candidate mode models such as 350 from the corresponding visual element model 340 associated with the input visual element 320.

As noted a mode model such as 350 represents the visual content of the corresponding visual element 320 over a history of many frames 300. As further noted multi-dimensional input values from the visual element 320 can be mapped to a single probability value 370 indicating the probability that the corresponding mode model 350 matches the input visual element 320 in question. These probability values such as 370 can be mapped, as depicted by an arrow 375, to corresponding visual support values such as 377 in a number of different ways.

Accordingly, in a next step 420 the processor 805 determines from the probability values such as 370, corresponding visual support values such as 377 for the candidate mode models selected in the step 410. In general, the visual support value 377 is an indication of the visual similarity between the visual element 320 in question and the mode model 350.

In one arrangement, the probability of matching 370 is used directly as the corresponding visual support value 377. In another arrangement, a fixed point approximation of the probability of matching 370 is used as the visual support 377 value. For example, the probability of matching 370 value is between 0 and 1, and this can be multiplied with a fixed point number say 2048, and the result rounded to the nearest integer. In another example, the probability of matching 370 value is a fixed point value between 0 and 4096, and it is shifted right to result in a corresponding visual support 377 value between 0 and 2048.

Accordingly, the visual support values such as 377 are derived from the corresponding probabilities of matching 370, which are computed for each candidate mode model 350 in the corresponding visual element model 340. These probabilities 370 are mapped 375 to corresponding visual support value 377. For example, the following mappings 375 may be used:

| Probability | Visual support value |
|---|---|
| 0.0-0.1 | 0 |
| 0.1-0.4 | 1 |
| 0.4-0.6 | 2 |
| 0.6-0.9 | 3 |
| 0.9-1.0 | 4 |

After computing visual support values such as 377 for corresponding candidate mode models such as 350 in the step 420, the processor 805 determines, in a step 430, a selected mode model for neighbours of the visual element in question 320. This step 430 can, for example, be performed by selecting the mode model 332 which is seen to have the highest visual support value 333.

In a following step 440 (see FIG. 5 for more detail), the processor 805 determines a spatial support value for each of the candidate modes selected in the step 410 for the visual element 320 in question. In general, spatial support is a measure of the extent to which one or more neighbouring visual elements have one or more associated mode models which have similar temporal characteristics to one or more mode models of the visual element in question. Thus for example the visual element 331, which is a neighbouring visual element of the visual element 320 in question, is considered to provide spatial support to a candidate mode model 350 of the visual element 320 in question if one of the mode models 385 of the neighbouring visual element 331 has a similar temporal characteristic 387 to a temporal characteristic 360 of the mode model 350.

In one arrangement, mode models of each of the 4-connected neighbours "A", "B", "C" and "D" of the visual element "X" (ie 320) is compared to each of the candidate mode models such as 350 in the visual element model 340 to check if a neighbour such as 330 provides spatial support. Spatial support is determined based on temporal information such as 387.

Mode models 350, 385 record information about their respective temporal characteristics 360, 387.

In one arrangement, the temporal characteristic 360, 387 is an activity count which is computed as follows. When new mode models 350, 385 are first created for their respective visual elements "X" (ie 320) and "A" (ie 331), the respective activity counts 360, 387 are set to 1. After that, each time that mode models 350, 385 are selected as a match to the corresponding input visual elements "X" and "A", the activity counts 360, 387 of the respective mode models 350, 385 is incremented by 1.

If visual elements 320, 331 belong to the same visual object, the visual elements 320 and 321 will typically have mode models 350, 385 which have similar activity counts 360, 387.

A visual element 331, which is a neighbouring visual element of the visual element 320 in question, is considered to provide spatial support to a candidate mode model 350 of the visual element 320 in question if one of the mode models 385 of the neighbouring visual element 331 has a similar temporal characteristic 387 to a temporal characteristic 360 of the mode model 350.

In one arrangement, the activity counts 360 and 387 (having respective values 25, 23) are considered to be similar if the difference between their values is smaller than a predetermined threshold, say 5 (in the present example the activity counts differ by "2" and are thus similar). In another arrangement, the difference is capped. That is, if both activity counts 360 and 387 have a value greater than a threshold, say 100, they are considered to be similar.

The difference computation may be done using other temporal characteristics in the same fashion as described above for the activity count temporal characteristic. For example, in another arrangement, the temporal characteristic used is the creation time instead of activity count. In yet another arrangement, the temporal characteristic used is the reappearance time (which is the last time when the mode switched from inactive (not matched) to active (matched), that is: the start of a sequence of matches for the modes). For practical reasons, this may be implemented as the last time the mode was not matched. Updating of the reappearance time may include a noise filter. That is, the reappearance time may be reset to the current time only if the mode was not matched for at least a number of times, say 3.

The step 440 determines spatial support values for at least some of the mode models of the visual element in question the spatial support values being provided by at least some of the mode models of other visual elements that are typically in the vicinity of, or indeed are immediate neighbours of, the visual element in question.

In one arrangement, all candidate mode models such as 350 in the visual element model 340 for the visual element 320 are compared to the single mode model 385 in the visual element model 380 associated with the neighbouring visual element 331 after determining that the mode model 385 is a "match" in the step 430. In this arrangement the mode model 385 is selected from all mode models in the visual element model 380 based on the similarity value 391 of the mode model 385. The matching process 430 can be applied in multiple passes over the input frame 300. In further passes, a mode model match can be made that is different from the initial selection 385 based on visual similarity 391 according to the method described below. Another mode model 382 may then be chosen as the selected mode model for temporal comparison with the candidate mode models 350.

Returning to the process 140 in FIG. 4, following the step 440 the processor 805 selects (ie identifies) a matching mode such as 350 for the visual element "X" (ie 320) in question, from the other candidate mode models such as 332 in the visual element model 340 based upon (a) the visual support values determined in the step 420, and (b) the spatial support values determined in the step 440. The step 450 thus completes the SABMM mode matching process referred to in the step 140 in FIG. 1, and the process 140 terminates with an END step 490.

Figure 5:
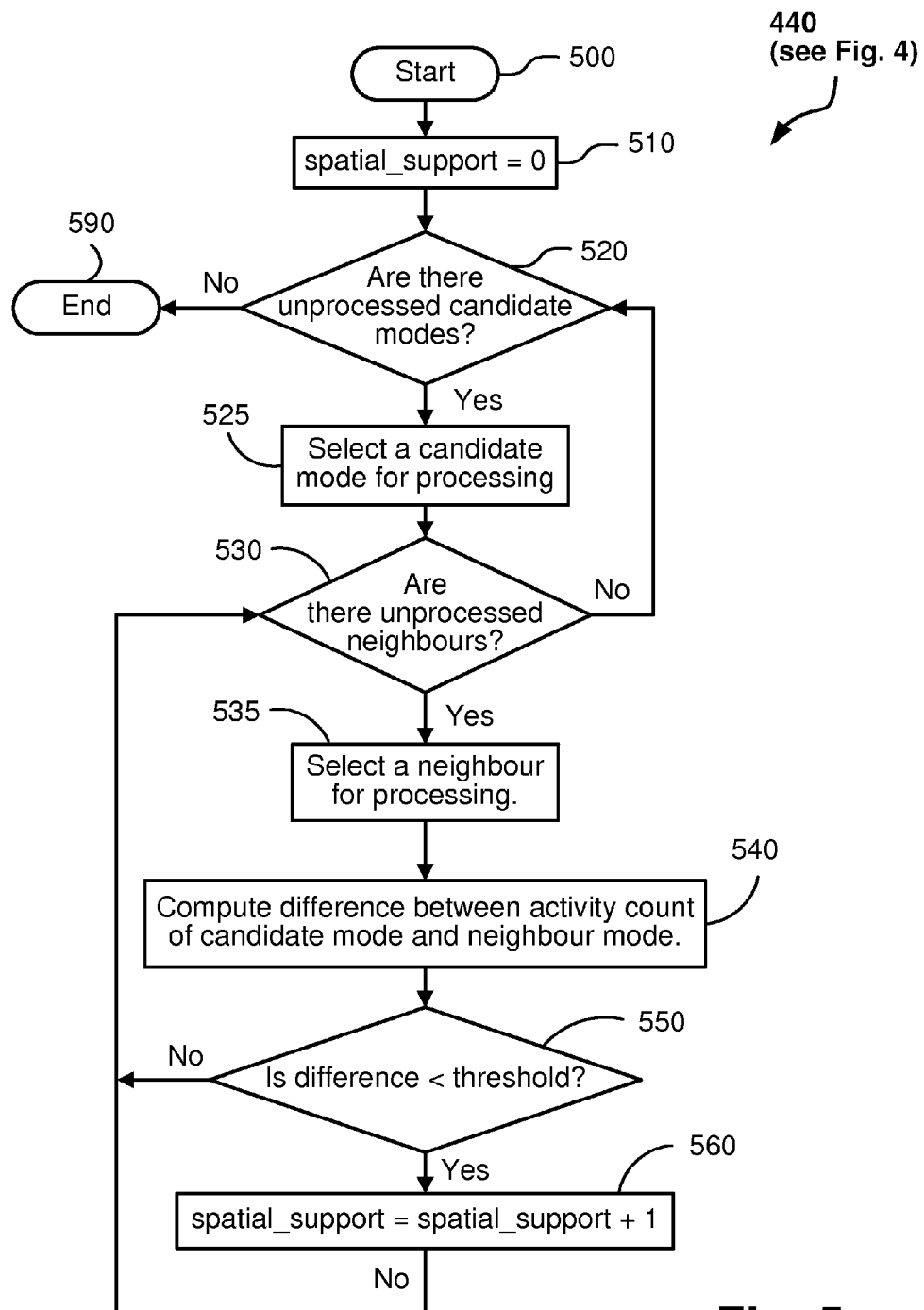
FIG. 5 is a flow diagram illustrating a method of computing spatial support.

FIG. 5 is a flow diagram illustrating a method 440 (see FIG. 4) of computing spatial support. The 440 process commences with a start step 500 and in a following step 510 the processor 805 initialises the spatial_support value to 0 (it is noted that candidate mode models such as 350 are compared to their neighbours in a later step 540). In a following step 520 the processor 805 determines if there are any further unprocessed candidate mode models. If there are no more candidate mode models for which spatial support should be computed, the process 440 is finished and is directed from the step 520 via a NO arrow to a step 590 which returns the spatial_support value and terminates. Otherwise, the process 440 follows a YES arrow from the step 520 to a step 525 in which the processor 805 selects an unprocessed candidate mode model such as 350 (see FIG. 3) for a temporal comparison with mode models such as 385 associated with neighbouring visual elements such as 331.

In a following step 530, the processor 805 determines if there are any unprocessed neighbouring visual elements. If this is not the case, then the process 440 follows a NO arrow from the step 530 back to the step 520. If however there remain unprocessed neighbouring visual elements, then the process 440 follows a YES arrow from the step 530 to a step 535.

In one arrangement, the 4-connected neighbouring visual elements such as 330 of the visual element 320 are considered in the step 535 by the processor 805, and one of the neighbouring visual elements such as 331 is selected for processing. The activity count such as 360 of the selected candidate mode model 350 and the activity count such as 387 of the selected mode model 385 (associated with the neighbouring visual element 331) are compared by the processor 805 in a subsequent step 540.

In one arrangement, the absolute value of the difference between the two activity counts 360 and 387 is calculated. In a following step 550 the processor 805 compares the absolute value of the difference to a threshold, say 5 frames or 1 second. If the value is smaller than the threshold, this means that the neighbouring visual element 331 has a selected mode model 385 that is temporally similar to a candidate mode model 350 associated with the visual element 320 in question, and in this case the process 440 follows a YES arrow from the step 550 to a step 560 in which the processor 805 increments the spatial support for that candidate mode model 350. Otherwise, the process 440 follows a NO arrow from the step 550 to the step 530 and the spatial support is unchanged.

In one arrangement, the process 440 is repeated for all candidate mode models of the visual element in question, and for all neighbouring visual elements. For example, if there are 3 neighbours such as 331 with a selected mode model 385 that is temporally similar to the candidate mode model 350, and 1 neighbour such as 330 with a sufficiently different activity count, then the spatial support for the visual element 320 is 3.

As previously noted, the step 450 in FIG. 4 identifies (selects) a matching mode from the candidate modes. For each candidate mode model such as 350, the spatial support and the visual support are added to compute a mode matching score as follows:

$$\text{Spatial\_Support} = \sum_i w_s^i \cdot \text{Spatial\_Support}^i \quad [1]$$

$$\text{Mode\_matching\_score} = w_v \cdot \text{Visual\_Support} + w_s \cdot \text{Spatial\_Support} \quad [2]$$

where: Spatial_Support$^i$ is the spatial support provided by the i-th neighbouring mode model, $w_s^i$ is the weight for the spatial support provided by the i-th neighbouring mode model, determining the contribution of that neighbour to the final spatial support value. In one arrangement, the weights have equal values for all neighbours, say 0.25. In another arrangement, the weight is 0.2 for the 4 horizontal/vertical neighbours, and the weight is 0.05 for the 4 diagonal neighbours. In another arrangement, the weights are adjusted for visual elements on the edge of a frame that have less than 4 4-connected neighbours. For example, the weight for diagonal 8-connected neighbours may be set to 0 in most cases, but set to 0.2 when an edge visual element is encountered. In another arrangement, weights correspond to the distance to the neighbour. For example, a direct 4-connected neighbour gets a weight of 0.15, while the 4-connected neighbour of the direct neighbour gets a weight of 0.05. Weight $w_v$ is the weight for the visual support, say 0.7, determining the contribution of the visual support to the mode_matching_score. Weight $w_s$ is the weight for the spatial support, say 0.3, determining the contribution of the spatial support to the mode_matching_score. In one arrangement, the spatial support is either 0 or 1 as determined by thresholding according to a Spatial_Support_Threshold, say 5 frames or 1 second as follows:

$$\text{Spatial\_Support}^i = \begin{cases} 1, & \text{if } |\text{activity\_count}^i - \text{activity\_count}^c| > \text{Spatial\_Support\_Threshold} \\ 0, & \text{otherwise} \end{cases} \quad [3]$$

In another arrangement, the spatial support is proportional to the difference in temporal characteristics:

$$\text{Spatial\_Support}^i = \begin{cases} 1 - \dfrac{\left|\dfrac{\text{activity\_count}^i - }{\text{activity\_count}^c}\right|^2}{\text{diff\_thr}}, & \text{if } \left|\text{activity\_count}^i - \text{activity\_count}^c\right| < \text{diff\_thr} \\ 0, & \text{otherwise} \end{cases} \quad [4]$$

where: activity_count$^i$ is the activity count of the i-th neighbouring mode model, and activity_count$^c$ is the activity count of the candidate mode model. Threshold value diff_thr is the maximum allowed difference, say 10 frames or 2 seconds, at which the spatial support is set to 0. Weight $w_s^i$ is a weight indicating the relative importance of the spatial support from the i-th neighbouring mode model, say 0.25. Spatial_Support is the total spatial support given to the candidate mode. Weight $w_v$ indicates the importance of the visual support, say 0.5, and weight $w_s$ indicates the importance of the total spatial support, say 0.5. Note that the weight can be used to normalise the support values, e.g. $w_s$ may be set to 1, whilst $w_s^i$ is set to 0.125 for each of the four components.

In one arrangement, the mode matching score is computed for each candidate mode model such as 350, and the candidate mode model 350 with the highest mode matching score is selected as the matching mode corresponding to the input visual element 320. In another arrangement, a mode matching threshold value, say 4, is used. The mode matching score is computed for candidate mode models such as 350 until a mode matching score exceeds the threshold. That is, the match is with a candidate mode model 350 that is good enough rather than the best.

Returning to FIG. 4, the processing of a visual element terminates with the step 490, after which another visual element can be processed in a similar fashion.

Similar to visual support and spatial support, a further metric referred to as "temporal support" may be included in the SABMM approach. In one arrangement, it is assumed that mode models are persistently matched over a period of time, meaning that if a mode model was matched in previous frames, it is likely to be matched in the current frame as well. In general, the temporal support value associated with a mode model is the number of times that mode model was selected as the matching mode model (according to the step 140 in FIG. 1 or the step 450 in FIG. 4) in the recent past (as defined by a predefined search window), for example in the previous frame or in the last 2 seconds.

The search window for computing the temporal support should not be too long as it would make it hard for a change in matching mode model. A large search window makes it harder to detect new foreground mode models, while a small window, say 1 frame, has the effect of noise reduction. Although the temporal support is useful in refining the mode matching decision, it should not have too high a weight in the mode_matching_score as follows:

$$\text{Mode\_matching\_score} = w_v*\text{visual\_support} + w_s*\text{spatial\_support} + w_t*\text{temporal\_support} \quad [5]$$

where $w_t$ is a weight indicating the importance ascribed to temporal_support.

The contribution of the various types of "support" (ie visual support, spatial support and temporal support) to the mode_matching_score is determined by the respective weights ($w_v$, $w_s$, and $w_t$) and the range of values of the various support attributes. The range of values of the various support attributes may be normalised directly, or they may be normalised via the respective weights.

In one example, the visual support has a range from 0 to 5 (as a system setting or as a user parameter setting), the spatial support has a range from 0 to 4 (4-connected neighbours), and the temporal support has a range from 0 to 1 (1 frame window). Furthermore, $w_v=0.33$, $w_s=0.33$, and $w_t=0.33$. This example does not lead to equal contributions, as the ranges are not normalised. The actual contributions are 0.5 for visual_support, 0.4 for spatial_support and 0.1 for temporal_support. In practice, it is desirable to set weights such that visual_support has an actual contribution of 0.5 or slightly higher, so that the spatial_support and temporal_support serve as corrections rather than dominant factors.

The weights for spatial_support may be adjusted based on the position of the visual element such as 320 in the input frame 300 (see FIG. 3). In one SABMM arrangement, if the visual element 320 is at the border of the input frame 300 and it has less than four 4-connected neighbours such as 330, then the weight for spatial_support is adjusted. For example, for a corner visual element such as 320, the spatial_support weight may be doubled. In another arrangement, additional neighbours such as 330 are recruited for border visual elements such as 320. For example, for a corner visual element such as 320 an additional 8-connected neighbour may be used, as well as an additional neighbour that is not immediately adjacent, for example the left adjacent neighbour of the left adjacent neighbour 330.

Iterations

In the above description, candidate mode models of a centre visual element (such as 320 in FIG. 3) are compared to selected mode models of neighbouring visual elements (such as "A", "B", "C" and "D"). The selection of the mode models of neighbours is based on the best match. This introduces an interdependency, as the best match of a neighbour may depend on the best match of the centre visual element. If only one iteration of the mode matching process is performed over the current frame 300, spatial support cannot be used in regard to all neighbours, and other measures need to be used for selection, such as the matching probability (this being related to visual support). However, if the process is iteratively performed a succession of times, ie if multiple iterations are successively performed, results can be refined at each iteration. The best matching mode model of the neighbour is then determined by the previous iteration.

In one arrangement, in a first seeding iteration mode models are selected based on the matching probability 370 (see FIG. 3). Then, in a second iteration, selections may be adjusted based on the spatial support. As in each iteration a mode model selection may be changed, there is a possibility that other mode model selections in the vicinity of the visual element in question (such as 320) are affected in the next iteration. In one arrangement, a fixed number of iterations, say 4, is performed. In another arrangement, iterations are performed until there are no more changes, or the number of changes is lower than a threshold, say 5%.

For each iteration, different parameter settings may be used. For example, a different connectivity may be used, say 8-connected instead of 4-connected, in each step. Also, the difference in temporal characteristics may be calculated differently, for example by applying a square root to the difference value.

Other SABMM Applications

When all visual the elements such as 330 in the input frame 300 have been matched to corresponding mode models, the matching candidate mode models can be classified (also referred to as segmented) as foreground or background. The classic, binary approach to segmentation would typically lead to a loss of information. For example, if a car is parked and a person walks in front of it, the segmentation result will show a combined car-person shape. There is no way of distinguishing the car and the person without going back to the original image. In the SABMM approach disclosed above, temporal characteristics are used to relate multiple visual elements to an object. The same temporal characteristics can be used to do a non-binary foreground/background segmentation, where the focus is on segmenting foreground objects in more detail. This approach is referred to as spatio-activity connected component analysis (SACCA).

Figure 6:
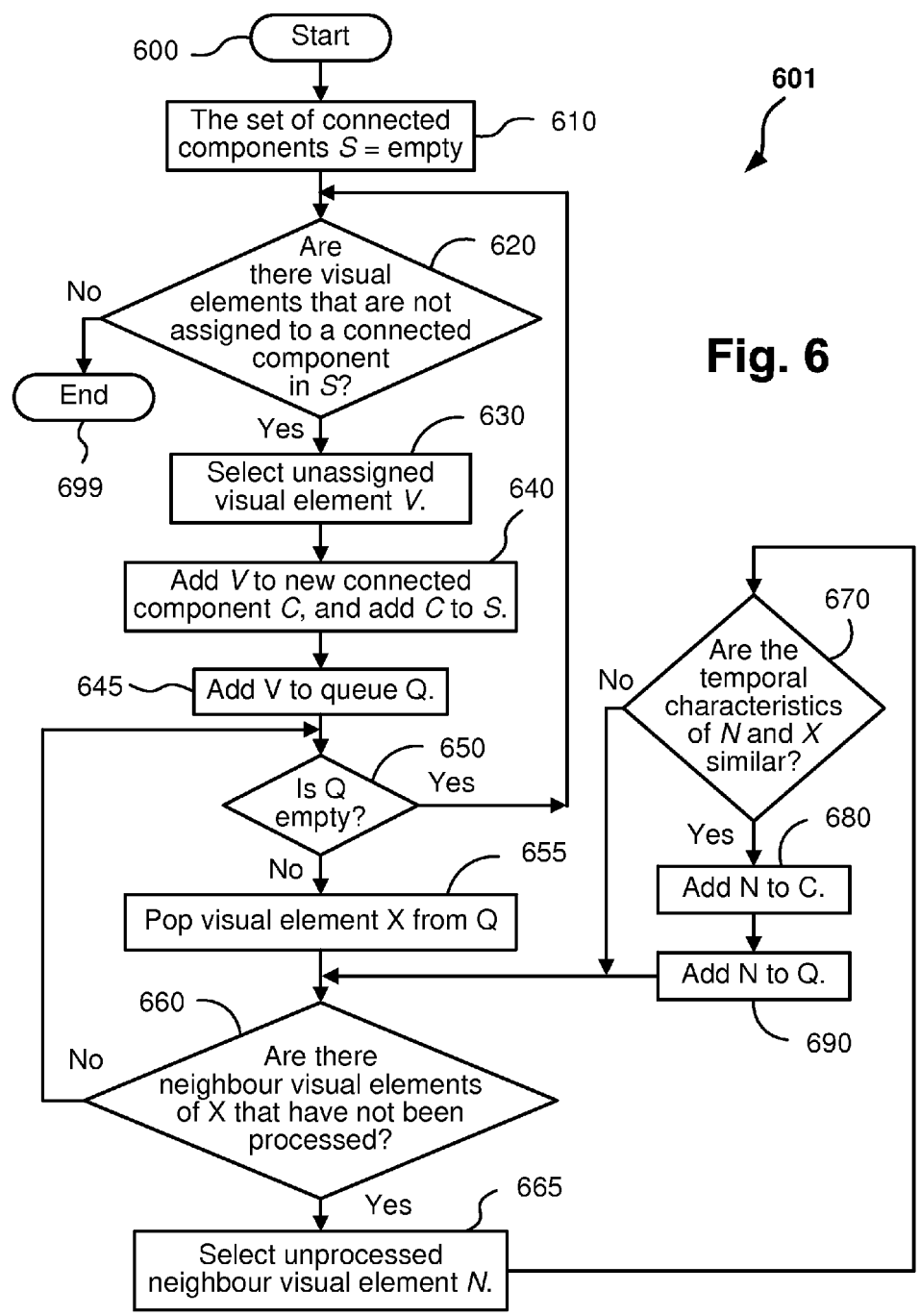
FIG. 6 is a flow diagram illustrating a method of activity based connected component analysis.

FIG. 6 is a flow diagram illustrating a method 601 of spatio-activity based connected component analysis. The purpose of the method 601 is to assign visual elements such as 330 to a connected component based upon the fact that the candidate mode 350 matches the visual element 320. The method 601 commences with a start step 600 and in a following step 610 the processor 805 initialises a set of detected connected components to an empty set. We refer to the set as S. In a following step 620 the processor 805 determines if there are visual elements such as 330 in the input frame 300 that have not yet been assigned to a connected component in S. If this is not the case then the input frame 300 has been processed and the method is complete, and the method 601 follows a NO arrow from the step 620 to a termination step 699.

If there are unassigned visual elements such as 330, then the method 601 follows a YES arrow from the step 620 to a step 630 in which the processor 805 selects an unassigned visual element V such as 330, where V has a unique identifier within the frame 300. In one arrangement, the selection is based on the coordinates of the visual element with respect to the input frame 300. For example, pixels or blocks are processed in a row-wise order, starting at the top-left corner of the frame 300. The unique identifier is, in the present example, made up of the x- and y-coordinates of the visual element. In a following step 640 the processor 805 creates a new connected component C, and visual element V is assigned to C, and C is added to S. In a following step 645 the processor 805 adds the visual element V to a processing queue.

In a following step 650 the processor 805 determines if the processing queue Q is empty. If this is the case the connected component C has been fully defined and control is returned via a YES arrow from the step 650 to the step 620 to find more connected components for unassigned visual elements such as 330. If the processing queue according to the step 650 Q is not empty, there may be more visual elements such as 330 that belong to connected component C. The process 601 thus follows a NO arrow from the step 650 to a step 655 which, to check this possibility, pops a visual element X from the processing queue Q, noting that X itself is already part of connected component C (see the step 645).

In a following step 660 the processor 805 checks whether the neighbouring visual elements (neighbours) of the visual element X have been processed already. A neighbour is considered processed if it has been assigned to a connected component in S. This connected component may be C, or it may be another, previously processed connected component. In one arrangement, the 4-connected neighbours are checked. In another arrangement, the 8-connected neighbours are checked. If, according to the step 660, there are no neighbours that have not yet been processed (that is all neighbours have been processed), then an edge of the connected component has been reached, and control follows a NO arrow from the step 660 to the step 650 to process queue Q further. If, according to the step 660 there are neighbours that have not yet been processed, then in a following step 665 the processor 805 selects an unprocessed neighbour N for further processing. In one arrangement, a random unprocessed neighbour is selected.

In another arrangement, the neighbouring visual element with the lowest unique identifier is selected. In a following step 670 the processor 805 compares the matched candidate mode models 350 of X and N according to similarity of one or more temporal characteristics. Accordingly, in one arrangement, the creation time of the mode model is used for comparison. If the difference between the creation time of N's matching mode model and the creation time of X's matching mode model is smaller than a threshold, say 10 frames or 3 seconds, the visual elements N and X are considered to be similar to one another. In another arrangement, the activity counts such as 360 of the matching mode models are used for comparison. The mean and standard deviation of the difference in activity counts such as 360 of matching mode models such as 350 of all visual elements such as 320 and at least one neighbour such as 330 in the input frame 300 are computed. Next, a threshold is set dynamically, for example to the mean minus 2 standard deviations. If the difference between the activity counts such as 360 of the matching mode models 350 of X and N is smaller than the threshold, the visual elements 320 are considered to be similar to one another.

If, according to the conditions considered in the step 670 the temporal characteristics of X and N are not similar, then the two visual elements such as 320 and 330 are not considered to be part of the same connected component C, and control is returned via a NO arrow from the step 670 to the step 660. If, according to the step 670 the temporal characteristics of X and N are similar, then the two visual elements are considered to be part of the same connected component C, and the process 601 follows a YES arrow from the step 670 to a step 680 in which the processor 805 adds N to C. In a following step 690 the processor 805 adds N to processing queue Q, so that the neighbours of N will be checked to be part of C in a later stage. Control is then returned to the step 660 to process visual elements in the queue Q further.

In one arrangement, the foreground/background segmentation is performed on the resulting set of connected components S. For each connected component C in S, the creation times of the corresponding matching mode models are used to determine whether the component is foreground or background. For example, the earliest creation time of all matching mode models corresponding to visual elements in C is used, or the mean creation time. The difference between creation time of C and the current time is then compared to a threshold. If the difference is greater than a threshold, the visual elements in C are considered background. If the difference is smaller than or equal to a threshold, the visual elements in C are considered foreground.

In another arrangement, foreground/background segmentation is integrated into the spatio-activity connected component analysis. For this approach, it is assumed that segmentation of background is not important, and that the focus is on further segmentation and separation of foreground. In the step 670, X and N are always considered to be similar if the temporal characteristics such as 360 of the matching mode models 350 of individual visual elements 320 both exceed a threshold. That is if they can both be considered background. If the threshold is not exceeded in both cases, the comparisons described above are applied. For example, X and N are considered similar if the differences between corresponding creation times and the current time are both higher than a threshold, say 200 frames or 60 seconds, even though X's creation time may be 100 seconds since system start and N's creation time may be 1000 seconds since system start.

Computing Probabilities

As previously noted in regard to determination of visual support values (eg see 420 in FIG. 4) multi-dimensional input image values from the visual element 220 can be mapped to one probability value, indicating the probability that a particular mode model such as 240 matches the input visual element 220 in question. Comparison of probabilities is then used to determine visual support values.

Returning to this issue in more detail, it is noted that in one arrangement, multi-dimensional values in mode models 350 are compared to a visual element 320 as follows. Let the modelled values in the mode model 350 be a subset of the available DCT coefficients, such as the first 6 out of 64 DCT coefficients of the Y-channel, the first out of 64 DCT coefficients of the U-channel, and the first out of 64 DCT coefficients of the V-channel. The coefficient values may be quantised or dequantised. For example, the mode model 350 values are {23, 68, 11, 99, 78, 22, 88, 23}, and the visual element 320 has the corresponding values {48, 60, 9, 88, 76, 55, 87, 13}. Now values can be computed that represent the correspondence between the mode model 350 and the visual element 320. In one arrangement, the absolute value of the differences are computed, in the example resulting in a multi-dimensional value {25, 8, 2, 77, 2, 33, 1, 10}.

In another arrangement, an alternative colour space is used. Let the incoming values be coefficients according to the Y, U and V colour space (or the similar YCbCr colour space used in digital imaging systems). Then the original luminance component Y is used, but the U and V (or similarly Cb and Cr) chroma components are transformed to I and Q components of the YIQ colour space. The advantage of the YIQ colour space is that it is more robust to changes in colour due to lighting, e.g. in the case of shadows. That is, due to shadow invariance, the same colour with and without shadow cast on it will have more similar values in the YIQ colour space than in the original YUV or YCbCr colour space. The I and Q values can be derived from the U and V components by rotating the colour space coordinates 33 degrees. The I and Q differences (Idiff and Qdiff) between mode model 350 values and the visual element 320 can be computed as follows:

$$Idiff = -\sin 33 \cdot (U_i - U_m) + \cos 33 \cdot (V_i - V_m) \quad [5A]$$

$$Qdiff = \cos 33 \cdot (U_i - U_m) + \sin 33 \cdot (V_i - V_m) \quad [5B]$$

For computational efficiency, the sine and cosine values may be precomputed, and they may be rounded to integers, say 3 and 4 after multiplication with 5.

In another arrangement, additional interpretations of the values are computed, such as the chromatic distortion:

$$cd = (U_i - U_m)^2 + (V_i - V_m)^2 \quad [6]$$

where $U_m$ is the first DCT coefficient value of the U-channel of the mode model, $U_i$ is the corresponding coefficient value from the input frame, and similarly $V_m$ and $V_i$ are the first DCT coefficient values from the mode model and input frame respectively. In the example, cd is 9701. The additional interpretations assist in distinguishing differences caused by shadows and differences caused by foreground objects.

An interpretation, such as the Y differences, I and Q differences, or chromatic distortion, is referred to as a feature f. The total set of features used is F.

The multi-dimensional value is provided to a classifier which maps multi-dimensional values to a scalar value. Although the scalar value can be a binary value, classifiers that provide a more refined confidence, likelihood, or probability are preferred. The scalar value is referred to as a probability. In one arrangement, there are multiple classifiers providing different sets of matches. For example, a first classifier determines whether there is a match, while a second classifier determines whether shadows are present.

The state of the classifier is determined prior to the classification in a training stage. In the training stage examples of similar and dissimilar mode model/visual element pairs are provided to train the classifier. Although it does not matter whether quantised or dequantised coefficients are used in the training and classification processes, it is important that they are consistent. In practice, a classifier trained for quantised coefficients can easily be converted into a classifier that works on dequantised coefficients, and vice versa, as long as the quantisation tables are known and the type of data (i.e. quantised or dequantised) is known.

In one arrangement, the classifier is a Support Vector Machine (SVM). For example, a linear Support Vector Machine trains weights, say {10, 3,−2, 5, 1, 1, 7,−3}, and an offset, say {38}, and then uses the input values ({25, 8, 2, 77, 2, 33, 1, 10} in the example) to compute a weighted sum which is used as a probability. In another arrangement, the classifier is a Naïve Bayes classifier which computes the per-value probability $prob_f$ that a found value indicates similarity or dissimilarity based on distributions found in the training set. The per-value probabilities for all features in F, are multiplied to result in a final result probability $prob_{total}$:

$$prob_{total} = \prod_{f \in F} prob_f \quad [7]$$

In one arrangement, there is a lookup table and the difference value or interpretation value is looked up and mapped to a per-value probability. In another arrangement, the probabilities are represented by a model that is an approximation of the actual probabilities. The model may be created through linear regression, such as the least squares method, the weighted least squares method or maximum likelihood estimation, or non-linear regression, such as the Gauss-Newton method or the Levenberg-Marquardt method. A non-linear regression problem may be turned into a linear regression problem by applying a transformation, such as a logarithm operation, at the cost of accuracy. In the case of a linear regression approximation, the mapping of a difference value or interpretation value to a per-value probability is then a matter of finding the corresponding point on a line. When the probabilities have been determined, they are multiplied. In another arrangement, the feature values are sampled into bins, where an example of a bin is value range 100 to 200, and the probabilities are determined for those bins.

As the probability values may be very small, in one arrangement logarithms are used. Instead of multiplying the per-value probabilities, the logarithms of the value are added as follows:

$$prob_{total}^{log} = \sum_{f \in F} \ln\left(\frac{1}{prob_f} - 1\right) \quad [8]$$

Updating a Mode Model (Such as 350 in FIG. 3)

After a mode model such as 350 has been matched to the input visual element 320, the mode model 350 is usually updated based on the new measurement, i.e. visual element 320. This allows a mode model to adapt to changes in the visual content of the mode model, e.g. a lighting change. This adaptation addresses gradual changes, whereas abrupt, significant changes should lead to the creation of a new mode model.

In one arrangement, the mode model computes a moving average. Every value in the mode model 350 is updated with the corresponding value in the visual element 320. For example, the matched mode model 350 values are {23, 68, 11, 99, 78, 22, 88, 23}, and the visual element 320 has the corresponding values {48, 60, 9, 88, 76, 55, 87, 13}. A learning rate, say 0.05, is used to determine how fast the mode model 350 updates. In the example, the new values are {0.95*23+ 0.05*48, 0.95*68+0.05*60, etc.}. The learning rate may be different for each coefficient.

In another arrangement, the mode model 350 computes a median for each coefficient. For each coefficient, a history of values is kept, say the last 10 captures. The value of the input visual element 330 is added to the history and the values are sorted so that the median value can be selected. Although the median is a good measure for mode modelling because it is robust to noise, it is also computationally very expensive.

In yet another arrangement, the mode model 350 adapts through an approximated median approach. No history is kept. Instead, the values of the input visual element 330 are compared to the values of the mode model 350 for each modelled coefficient coeff, resulting in model updates as follows:

$$Model_{coeff}^{t} = \begin{cases} Model_{coeff}^{t-1} + c_{up} & \text{, if } Captured_{coeff} > Model_{coeff}^{t-1} \\ Model_{coeff}^{t-1} & \text{, if } Captured_{coeff} = Model_{coeff}^{t-1} \\ Model_{coeff}^{t-1} - c_{down} & \text{, if } Captured_{coeff} < Model_{coeff}^{t-1} \end{cases} \quad [9]$$

where $Model^{t}_{coeff}$ models the coeff-th coefficient at time t (or the t-th frame processed), $Captured_{coeff}$ is the coeff-th coefficient value of the captured incoming block.

Hence, the values in the mode model are adjusted based on the direction of the difference rather than on the actual value. The mode model 350 values are increased with constant $c_{up}$, say 1, or decreased with $c_{down}$, say 1. The constant value may be different for each coefficient, and its magnitude determines how fast the mode model 350 adapts to captured values. The values of the constants may change over time. For example, initially the constants are set to a relatively high value, say 5, so that the mode model 350 can converge quickly. After modelling the scene for a while, the constants can be set to a lower value so that the mode model 350 is more robust to noise. The constants may be set to higher values again when a big change has been noticed in the scene or a part of the scene, e.g. if the lights are switched on or off.

In yet another arrangement, the mode model is not updated at all if some combination of criteria are met. For example, if the incoming data is deemed to have a high proportion of noise, or conversely if a mode match was so close that the mode would not be affected.

Deleting a Mode Model

Mode models 350 are kept in the memory 806 even when they have not been matched to the current visual element 320. This allows mode models 350 to match later input. However, in one arrangement, mode models 350 are not kept indefinitely. Firstly, memory resources may be limited. If a mode model 350 is not likely to be matched to later input, it should be deleted so that new mode models 350 can be created. Secondly, different objects may appear in the scene at different times but with the same visual characteristics. For example, when a person with a red coat stands at a location for a while, the mode model 350 will model the visual characteristics of the red coat. When another person with a red coat appears at the same location, a match is found even though it is a different person. Although this problem is unavoidable when just processing and modelling visual elements, it can be mitigated by deleting mode models 350 when they appear not to be in use. That is, if the second person with a red coat appears 1 second later, there may be a mode model match, but if the second person appears 1 day later, there won't be a model match.

In one arrangement, the temporal characteristics of all mode models 350 are checked as deletion candidates after the mode matching processing has finished. If the difference between the current time and the reappearance time (last time the mode model was found not to be representative for the input visual element) is more than a threshold value, say 1000 frames or 300 seconds, the mode model is removed or its temporal characteristics are reset.

Creating New Modes and Dealing with Shadows

Over time, new mode models may be created, e.g. when a new object enters the scene or when the background of the scene changes, such as a light being turned on. It is not desirable that input visual elements are always matched to an existing mode model. They should only be matched if the match is sufficient.

In one arrangement, a probability is computed that represents the probability that a mode model matches an input visual element with an acceptable level of confidence. In other words, a probability is determined that provides a figure of merit (ie a confidence level) for the mode matching performed, for example, by the step 140 in FIG. 1, or the step 450 in FIG. 4. This probability is computed for each candidate mode model. If the best matching probability is below a predetermined threshold, say 0.5, it is concluded that there is no suitable existing mode model for matching, and a new mode model needs to be created. The new mode model is initialised with the values of the captured input frame.

In another arrangement, the problem of shadows is addressed. It is debatable whether a shadow is foreground or background, and the decision depends on the context of a foreground separation application. In the context of this document, shadows are treated as non-foreground, as otherwise shadows tend to merge separate objects into one big object. That is, shadows need to be ignored.

Figure 7:
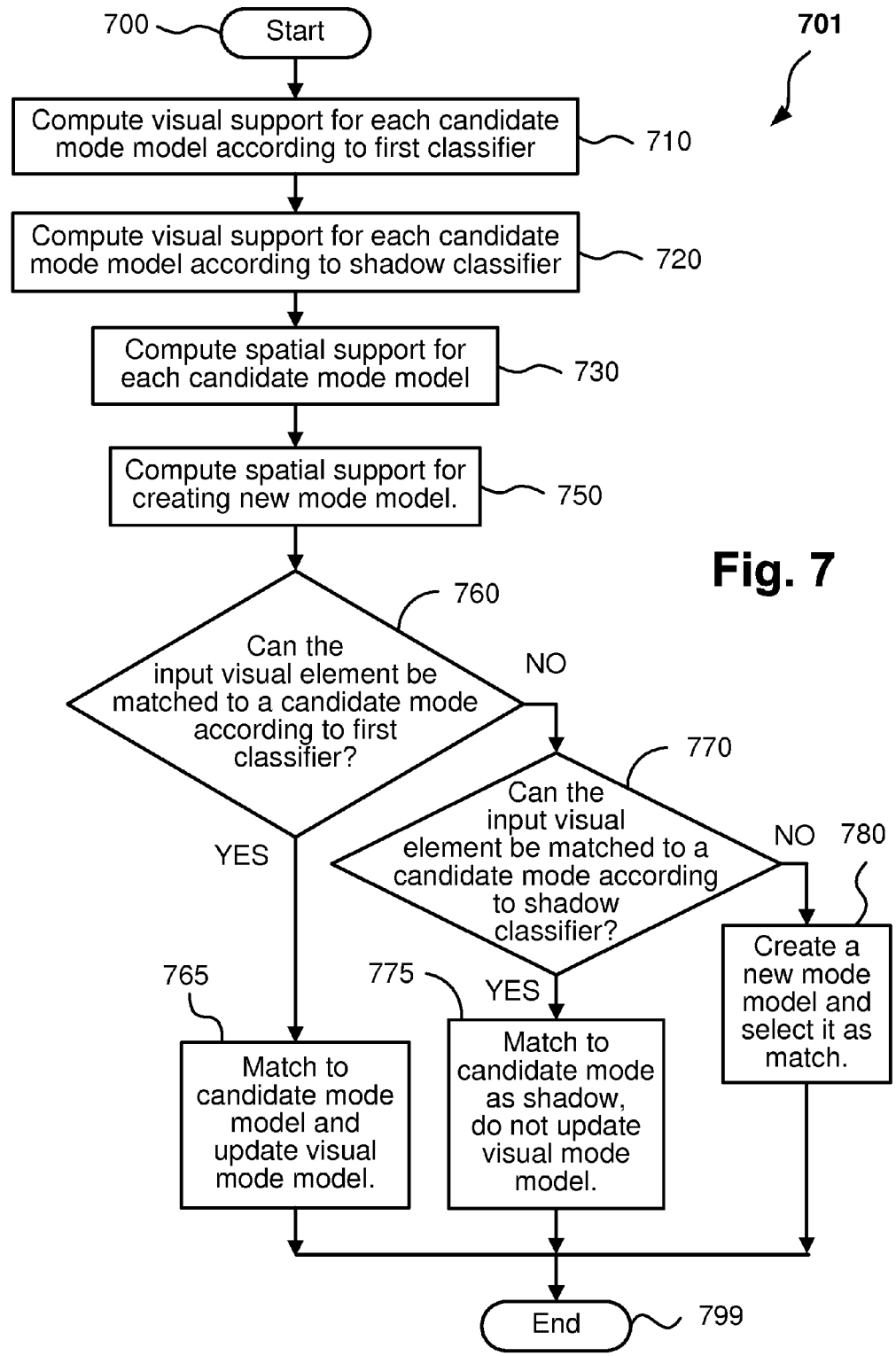
FIG. 7 is a flow diagram illustrating a method of shadow invariant updating of the visual element model.

FIG. 7 is a flow diagram illustrating a method 701 of shadow invariant updating of the visual element model. The process 701 commences with a start step 700 and in a following step 710 the processor 805 determines, using a classifier approach, a probability for each of the candidate mode models, as described earlier. This first probability is the probability that a mode model matches an input visual element, and the step 710 determines the regular visual support value. In a following step 720 the processor 805 determines a second probability which is the shadow probability that an input visual element is shadow (on top of the visual characteristics of a mode model) and the step 720 also determines a "shadow visual support" value.

In a following step 730 the processor 805 determines spatial support for each candidate mode model after which in a step 750 the processor 805 determines spatial support for creating a new mode (that is a mode with temporal characteristics initialised to start values, such as activity count of 0 and creation time of the current time). This enables a visual element to be classified into one of three classes namely "normal mode match", "shadow mode match", and "no mode match".

In a following step 760 the processor 805 determines a mode_matching_score (based on the visual support from the step 710 and the spatial support from the step 730) of the best matching candidate mode and compares this mode_matching_score to a threshold value, say 0.6, in order to find out if a match with an existing mode can be made. If, according to the step 760, the candidate mode does exceed the threshold, a normal match is found and the process 701 follows a YES arrow from the step 760 to a step 765 which updates the mode model according to the contents of the visual element. The process 701 is then directed to a STOP step 799.

Otherwise, if according to the step 760 the candidate mode model does not exceed the threshold, the creation of a new mode model is considered. To this end, the process follows a NO arrow from the step 760 to a step 770 in which the processor 805 determines the best matching candidate mode according to the shadow probability. Accordingly the step 770 compares the shadow probability to a threshold, say 0.7. If the shadow probability is higher than the threshold, no new mode is created, and the process 701 follows a YES arrow from the step 770 to a step 775 in which the processor 805 makes a match with that candidate mode. However, the candidate mode is not updated with the contents of the visual element. The process 701 is then directed to the STOP step 799.

Returning to the step 770, if the shadow probability is not higher than the threshold, then the process 701 follows a NO arrow from the step 770 to a step 780 in which the processor 805 creates a new mode model, which is initialised with the input visual element's contents. The process 701 is then directed to the STOP step 799.

Note that shadows may be classified as "normal mode match". This is acceptable, as the purpose of the shadow ignoring process is to not create new modes for shadows. There is no problem with classifying shadows as existing mode models.

In the above description, visual support was used to match modes. The range of values for visual support is usually quite small, because it is usually not necessary to be more than 1 value higher than the combination of spatial and temporal support, which in practice have maximum values limited by resource constraints. As a consequence, more than one mode may have the same support value and a best match cannot be determined. In one arrangement, the matching probability value is used as a tie breaker because it has a much wider range of values. Alternatively, the mode model that matched the visual element in the previous frame is selected, or an arbitrary mode model may be selected.

Processing Set

For ease of understanding, the above description describes processing of all visual elements in a frame. However, it may be possible to process only a subset of the visual elements. For example, only a user defined region of interest may be processed. In another example, if the resolution of the input frame 300 is sufficient, every fourth or second visual element is skipped.

Further SABMM Implementation Details

The SABMM methods may, as described in regard to FIG. 8, be implemented using the camera arrangement 800 wherein the processes of FIGS. 1, and 4-7 may be implemented as software, such as one or more application programs 810 executable within the camera system 800. In particular, the SABMM method steps are effected by instructions in the software that are carried out within the camera system 800. The instructions may be formed as one or more code modules, each for performing one or more particular tasks. The software may also be divided into two separate parts, in which a first part and the corresponding code modules performs the SABMM methods and a second part and the corresponding code modules manage a user interface between the first part and the user.

The software may be stored in a computer readable medium, including the memory 806. The software is loaded into the camera system 800 from the computer readable medium, and then executed by the camera system 800. A computer readable medium having such software or computer program recorded on it is a computer program product. The use of the computer program product in the camera system 800 preferably effects an advantageous apparatus for practicing the SABMM approach.

The camera system 800 also has an interface 808 which permits coupling of the camera module 801 to the network 814.

Typically, the SABMM application programs discussed above are resident in the memory 806 and read and controlled in execution by the processor 805. In some instances, the SABMM application programs may be supplied to the user encoded on one or more CD-ROM which can be loaded onto a PC (not shown) and downloaded onto the camera module 801 through a suitable interface (not shown), or alternatively may be read by the user from the network 814. Still further, the software can also be loaded into the computer system 800 from other computer readable media.

Computer readable media refers to any storage or transmission medium that participates in providing instructions and/or data to the computer system 800 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the camera module 801.

Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon a camera display (not shown). Through manipulation of a keypad (not shown) a user of the camera system 800 and the application may manipulate the interface to provide controlling commands and/or input to the applications associated with the GUI(s).

The SABMM method may alternatively be implemented in dedicated hardware such as one or more integrated circuits performing the functions or sub functions of the SABMM approach. Such dedicated hardware may include graphic processors, digital signal processors, or one or more microprocessors and associated memories.

As previously noted in regard to determination of visual support values (eg see 420 in FIG. 4) multi-dimensional input image values from the visual element 220 can be mapped to one probability value. In an alternative arrangement to those described above, a weighted sum of the absolute differences between each of the coefficients of visual element 220 and the m-th mode model $M^m$ 260 in visual element model 230 can be expressed as follows:

$$prob_{total}^{wsum} = \sum_{f \in F} a_f \cdot |B_f - M_f^m| \quad [10]$$

where f is a coefficient in the feature set F. For example, there are 8 coefficients. The first 6 coefficients are from the Y component, while the $7^{th}$ coefficient is the in-phase I coefficient and the $8^{th}$ coefficient is the quadrature coefficient Q (transformed from YCbCr). The value for weight $a_f$ is determined offline as follows. Naive Bayes training is used to determine the probability P that a given set of input coefficients match a given set of mode coefficients based upon a set of training data. A logistic regression is then applied to determine coefficients $a_f$ for each feature f in F. This yields $a_f$ as the linear regression coefficient of $\log(P(\text{match}|B_f\text{-}M_f^m)/P(\text{nomatch}|B_f\text{-}M_f^m))$ for all f in F.

The problem of selecting, in the step 140 in FIG. 1, a matching mode model is a matter of interpreting a probability value. In an alternative arrangement to those described above, the mode with the highest probability values is used to determine a final mode match or an initial mode match that is processed further based on the characteristics of neighbouring visual elements and corresponding visual element models as described above. If there is more than one mode with the highest probability value, further selection is based on the order in which the modes are stored in memory (e.g. the first mode), the creation time (e.g. the oldest creation time), the activity count (e.g. the highest activity count), or the reappearance time (e.g. the latest reappearance time).

It was previously noted that the probability value is not always high enough to warrant a match with an existing mode model. In this case, a new mode needs to be created. In one arrangement, the decision is made as follows. A new mode creation threshold for creating a new mode is determined by using the criterion that true positive rate+false positive rate=1. The threshold level where P(mode match) is 0.5, that is chance.

In the above description, the computation of a mode matching score was described. In an alternative arrangement, the initial probability value of the mode model $M^{max}$ with the highest probability is used as visual support. Next, adjacent blocks are examined for mode models with temporal characteristics similar to the temporal characteristics of mode model $M^{max}$. For example, the mode models are similar if the difference between their creation times is lower than a threshold, say 15 frames or 3 seconds, or if the difference between the current time and the creation time for both compared mode models is greater than a threshold, say 1000 frames or 5 minutes. Each time a similar mode model is found, the similar_neighbours_count is increased with 1. For a 4-connected examination of directly adjacent neighbours, this results in a similar_neighbours_count value between 0 and 4. A spatial support value is then determined through a lookup table, where there may be a different value for each similar_neighbours_count value, and for each iteration of the mode matching process. For example, in a system using 4-connectivity and a maximum of 3 iterations, there are 15 values in the lookup table. The spatial support value is added to the visual support value, and a temporal support value as described earlier may be added as well.

The lookup table is constructed as follows during an offline training stage. For each possible value of similar_neighbours_count and the number of iterations, a Receiver Operating Characteristic graph, which sets out true positive rate against false positive rate, is determined and the lookup value is taken at the point on the graph where the sum of the true positive rate and false positive rate equals 1, similar to the new mode creation threshold determination described above.

The updating of mode models using the approximated median approach as described in equation 9 may be extended in an alternative arrangement. A learning parameter a is added, which serves as a threshold that prevents the model from updating if there are small differences only.

$$Model_{coeff}^{t} = \begin{cases} Model_{coeff}^{t-1} + c_{up}, & \text{if } Captured_{coeff} > Model_{coeff}^{t-1} + s_{up} \\ Model_{coeff}^{t-1} - c_{down}, & \text{if } Captured_{coeff} > Model_{coeff}^{t-1} - s_{down} \\ Model_{coeff}^{t-1}, & \text{otherwise} \end{cases} \quad [11]$$

where $c_{up}$ and $c_{down}$ are the learning parameters that determine how fast the model adapts, and $s_{up}$ and $s_{down}$ are the stability parameters that determine how sensitive the model updating is to small changes.

As described before, the temporal characteristics of all mode models 350 are checked as deletion candidates after the mode matching processing has finished. In one arrangement, a future mode removal record is kept for each mode model 350. This is initialised when the mode model is created as follows:

$$\text{Future\_mode\_removal} = \text{current\_frame\_number} + c_0 + c_1 * \text{activity\_count}, \quad [12]$$

where $c_0$ is a constant indicating the minimum survival time of the mode model, say 10 frames, and $c_1$ is a constant, say 30%, indicating the minimum percentage of time this part of the scene must remain visible to retain its temporal information.

Every time a mode model has matched the input, the future_mode_removal is updated.

During mode removal checking, if the value of future_mode_removal matches the current_frame_number, the mode model is removed regardless of the total number of mode models for the visual element model. Note that always at least one mode model remains if $c_0$ is greater than 0. In addition, each time a new mode model is created, and the maximum number of modes per visual element, say 5, has been reached, the mode with the earliest future_mode_removal value is removed.

Results and Evaluation

Experimental Setup.

An evaluation video data set was recorded using a network camera providing a Motion-JPEG stream. Although the proposed algorithm is not specific to any particular flavor of JPEG compression, by using a specific camera, full control is provided over the recording circumstances, and influence of video transcoding is avoided.

The evaluation data set targets difficult, yet realistic scenarios. That is, the data set is typically not representative for the content an object detection system may encounter in practice. The focus of the evaluation is on indoor scenarios, where there is artificial lighting with in some cases additional natural lighting through windows. The data set is biased towards stationary foreground objects, stressing the importance of abandoned object detection and object removal applications. Each video starts with an empty scene to allow for initialisation of the background model. See the table below for details on the videos.

| Video | Description | Difficulty | Length in frames [Number of frames used in object mask ground truth] |
|---|---|---|---|
| 1 | Several people walk through reception area. | Screen saver visible. Low contrast difference between some foreground objects and background. | 3439 [896] |
| 2 | Person sits down to read newspaper. | Stationary objects. Screen saver visible. Low contrast difference between some foreground objects and background. | 1711 |
| 3 | Person sits down to read, relocates existing magazines, leaves a small object behind, and returns to fetch it. | Stationary objects. Screen saver visible. Low contrast difference between some foreground objects and background. | 6600 [6299] |
| 4 | Person moves around trolley in reception. There is a visible computer screen. | Structural changes of background. | 2939 [700] |
| 5 | Person sits down in office, moving existing chairs around. | Illumination change. Stationary objects. Screen saver visible. | 1658 |
| 6 | Person sits down in office, moving existing chairs around. Window blinds are swaying. | Rapid illumination change. Stationary objects. | 4159 |
| 7 | Person sits down, deposits an object, moves existing papers. | Structural changes of background. Screen saver visible. | 1435 [572] |
| 8 | Adult and child walk in corridor, from far away towards the camera. | Low contrast difference between some foreground objects and background. | 448 [370] |
| 9 | Multiple people walk through a hall way, leaving objects behind, and opening/closing boxes on the scene. | Stationary objects. | 2117 |
| 10 | Several people walk through a corridor, enter/exit at various points in the scene, stand still, and abandon small objects. | Stationary objects. | 1984 [1348] |

The screen savers present in some of the videos serve to stretch the modeling in that area of the scene for research purposes, as they have more states than the maximum number of modes.

For each of the 10 videos a bounding box ground truth was created. In addition, for more precise evaluation for in total 10,185 frames in 6 videos, an object mask ground truth was created, which is expected to be accurate within an error margin of 4 pixels. Note that the creation of ground truth is a problem in itself, and that different people or the same person at a different time may segment the same video differently. As creation of the precise object mask ground truth is very expensive manual labor, it was done for a subset of the videos only.

The DCT classifier and spatial classifier are trained on 6 frames acquired from 4 videos. The scenes and locations at which the training videos were recorded are different from the scenes used in the test set.

The SABMM object detection method for different numbers of iterations is compared to the Mixture of Gaussians method. For SABMM, the maximum number of mode models was set to 5. Results are shown in the table below.

| Method | F1-measure | tracking suitability | processing time (frames per second) | scene model memory usage (kB) |
|---|---|---|---|---|
| Mixture of Gaussians | 0.55 | 0.38 | 5 | 36,288 |
| SABMM - 0 iterations | 0.79 | 0.27 | 30 | 1,080 |
| SABMM - 1 iteration | 0.80 | 0.31 | 29 | 1,080 |
| SABMM - 2 iterations | 0.80 | 0.34 | 27 | 1,080 |
| SABMM - 3 iterations | 0.80 | 0.38 | 25 | 1,080 |

The Mixture of Gaussian method suffers from the trade-off between detecting moving objects and detecting stationary objects. Although for the data shown it has a precision higher than the SABMM method (0.79 versus 0.69), its recall is significantly lower (0.42 versus 0.95) indicating a large number of false negatives. The difference in performance at pixel level is not significant for the various iterations. However, the larger number of iterations shows a significant increase in tracking suitability, corresponding to a decrease in object fragmentation.

In the table below, the F1 measure is set out against the tracking suitability for those videos for which a precise object mask ground truth is available.

| Video | F1 measure | Tracking suitability |
|---|---|---|
| 1 | 0.858772 | 0.36 |
| 3 | 0.75979 | 0.47 |
| 4 | 0.601714 | 0.20 |
| 7 | 0.699466 | 0.56 |
| 8 | 0.749698 | 0.40 |
| 10 | 0.764572 | 0.82 |

Since the experimental setup did not focus on measuring processing time precisely, it is hard to draw final conclusions about the difference between the methods. However, the significant difference between Mixture of Gaussians and the SABMM approach supports the expectation that SABMM is significantly faster. Similarly, the difference in memory usage for scene modelling is significant.

INDUSTRIAL APPLICABILITY

It is apparent from the above that the arrangements described are applicable to the surveillance and data processing industries.

The foregoing describes only some embodiments of the present invention, and modifications and/or changes can be made thereto without departing from the scope and spirit of the invention, the embodiments being illustrative and not restrictive.

Thus, for example, the SABMM arrangements can be incorporated into one or more surveillance cameras which communicate, via a communications network, with a control centre. In the control centre a central controller can make use of the information provided by the SABMM arrangements to track unauthorised objects captured by the cameras.

The invention claimed is:

1. A method, in relation to a current video frame comprising a visual element having visual characteristics and corresponding to a location in the current video frame, of matching at least one of a plurality of mode models to the visual element, comprising the steps of:
    associating the visual element of the current video frame with the plurality of mode models, each corresponding to the same location as the visual element and having visual and temporal characteristics; and
    matching at least one of the plurality of mode models to the visual element of the current video frame, said matching step further comprising the steps of:
    determining a visual support value for each mode model depending upon a similarity between the visual characteristics of the visual element and of the mode model;
    determining a spatial support value for each mode model depending upon a similarity between the temporal characteristics of the mode model and of mode models associated with one or more other visual elements in the vicinity of the visual element of the current video frame; and
    identifying a matching one of the plurality of mode models depending upon the visual support values and the spatial support values.

2. A method according to claim 1, wherein said associating step is based on a time history of values for the visual element over a number of frames.

3. A method according to claim 1, wherein said first determining step comprises mapping at least one image value from the visual element to a probability value indicating the probability that the mode model matches the visual element.

4. A method according to claim 1, wherein said second determining step comprises determining if a mode model associated with the visual element and a mode model associated with one of the other visual elements have similar temporal characteristics.

5. A method according to claim 4, wherein the temporal characteristic is one or more members selected from the group consisting of:
    the number of times the mode model has matched the visual element in previous frames;
    the number of times the mode model has been updated;
    a time stamp corresponding to the creation of the mode model;
    the last time the mode model was found not to match the input visual element; and
    a weighted sum of all the times the mode model matched the visual element.

6. A method according to claim 1, wherein the other visual elements are neighbouring visual elements of the visual element.

7. A method according to claim 1, further comprising the steps of:
    performing the method iteratively over the current frame a succession of times; and
    selecting, in each iteration, the mode models associated with the one or more other visual elements used in the said second determining step based upon the previous iteration.

8. A method according to claim 1, further comprising the steps of:
   determining a temporal support value for a mode model depending upon the number of times the mode model was identified as the matching mode model in previous frames within a predefined search window; and
   identifying the matching mode model further depending upon the temporal support value.

9. A method of determining whether a first visual element and a neighbouring second visual element are parts of a connected component, comprising the steps of:
   identifying matching mode models for the first and second visual elements according to the method of claim 1; and
   determining if the first visual element and the second visual element are parts of the connected component depending upon whether a temporal characteristic of the matching mode model for the first visual element is similar to a corresponding temporal characteristic of the matching mode model for the second visual element.

10. A method according to claim 1, wherein prior to said identifying step, the method further comprises a step of creating, depending upon the visual support values and the spatial support values, a new mode model associated with the visual element.

11. A method according to claim 1, wherein prior to said identifying step, the method further comprises the steps of:
   determining a confidence level that the mode model to be identified matches the visual element depending upon the visual support value and the spatial support value for the mode model to be identified; and
   when the confidence level is below a predetermined threshold, creating a new mode model.

12. An apparatus, in relation to a video frame comprising a visual element having visual characteristics and corresponding to a location in the current video frame, for matching at least one of a plurality of mode models to the visual element, comprising:
   a memory and a processor cooperating to function as:
   an associating unit configured to associate the visual element of the current video frame with the plurality of mode models, each corresponding to the same location as the visual element and having visual and temporal characteristics; and
   a matching unit configured to match at least one of the plurality of mode models to the visual element of the current video frame, said matching unit further comprising:
   a first determining unit configured to determine a visual support value for each mode model depending upon a similarity between the visual characteristics of the visual element and of the mode model;
   a second determining unit configured to determine a spatial support value for each mode model depending upon a similarity between the temporal characteristics of the mode model and of mode models associated with one or more other visual elements in the vicinity of the visual element of the current video frame; and
   an identifying unit configured to identify a matching one of the plurality of mode models depending upon the visual support values and the spatial support values.

13. A non-transitory computer-readable storage medium having recorded thereon a computer program for directing a processor to execute a method, in relation to a video frame comprising a visual element having visual characteristics and corresponding to a location in the current video frame, of matching at least one of a plurality of mode models to the visual element, comprising:
   associating the visual element of the current video frame with the plurality of mode models, each corresponding to the same location as the visual element and having visual and temporal characteristics; and
   matching at least one of the plurality of mode models to the visual element of the current video frame, said matching step further comprising:
   determining a visual support value for each mode model depending upon a similarity between the visual characteristics of the visual element and of the mode model;
   determining a spatial support value for each mode model depending upon a similarity between the temporal characteristics of the mode model and of mode models associated with one or more other visual elements in the vicinity of the visual element of the current video frame; and
   identifying a matching one of the plurality of mode models depending upon the visual support values and the spatial support values.

14. A method, in relation to a current video frame comprising a visual element having visual characteristics and corresponding to a location in the current video frame, of matching the visual element to at least one of a plurality of mode models in a visual element model, comprising the steps of:
   associating said visual element of the current video frame with the plurality of mode models, each corresponding to the same location as the visual element and having visual and temporal characteristics; and
   matching at least one of the plurality of mode models to the visual element of the current video frame, said matching step further comprising the steps of:
   determining a visual support value for each mode model based on a correspondence between visual characteristics of the visual element and of the mode model in the visual element model;
   determining a spatial support value for each mode model based on a correspondence between temporal characteristics of the mode model and of one or more mode models associated with visual elements at locations other than the location of the visual element in the vicinity of the visual element of the current video frame; and
   selecting a matching mode model from the plurality of mode models based at least on the visual support values and the spatial support values.

15. A method according to claim 14, wherein the one or more mode models associated with visual elements at locations other than the location of the visual element are selected based on the output of a previous application of said method.

16. A method according to claim 14, further comprising the steps of:
   determining a confidence level in the selection based on the visual support value and the spatial support value of the selected matching mode model; and
   updating the visual characteristics of the selected matching mode model based on the confidence level.

17. A method according to claim 14, further comprising the steps of:
   determining a confidence level in the selection based on the visual support value and the spatial support value of the selected matching mode model;
   determining a shadow visual support value based on a correspondence between the visual characteristics of the visual element and of a mode model in the visual element model corresponding to the location of the visual element; and
   creating a new mode model and selecting the new mode model as the matching mode based on the confidence level and the shadow visual support value.

* * * * *